Jan. 19, 1960 MASATO KAWAMURA 2,921,420
DOUBLE TORPEDO RODENT EXTERMINATOR
Original Filed Nov. 13, 1958
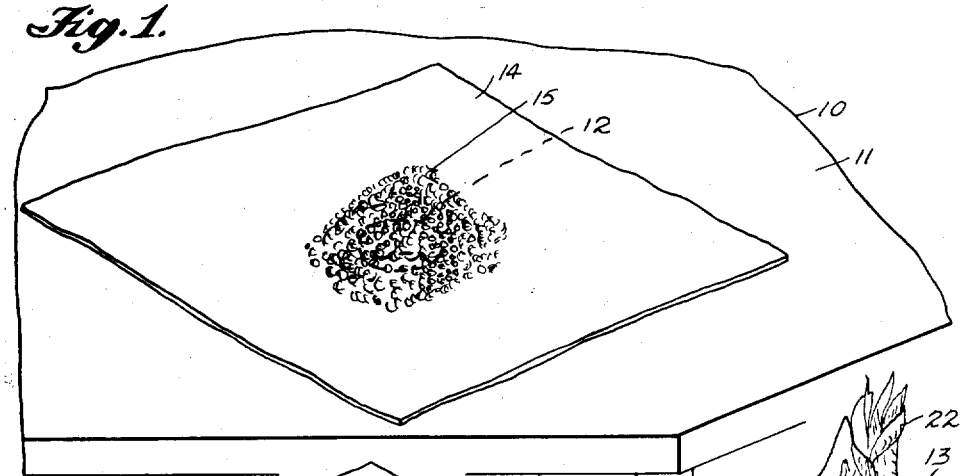
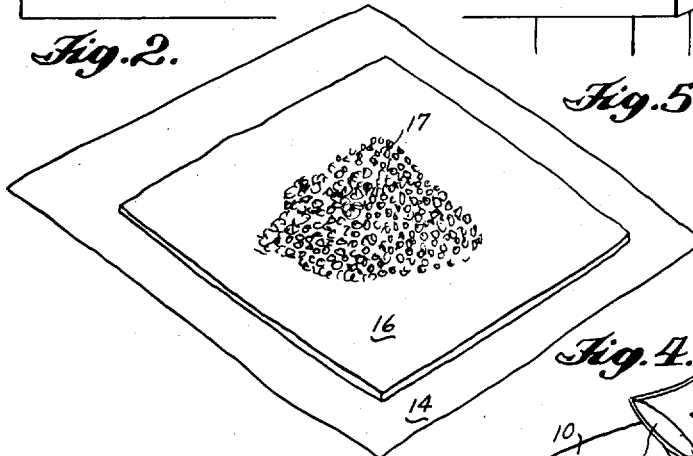
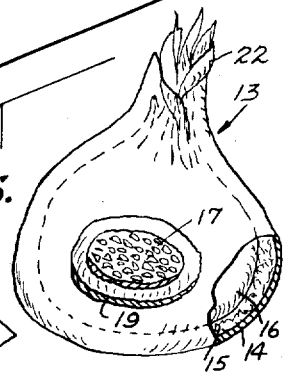
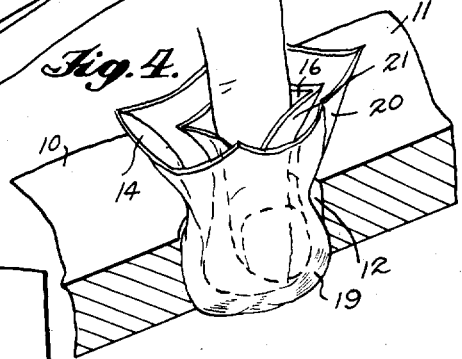
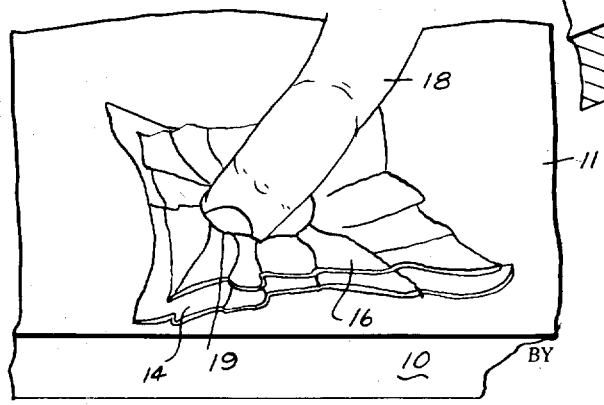
INVENTOR
MASATO KAWAMURA
BY

United States Patent Office 2,921,420
Patented Jan. 19, 1960

2,921,420

DOUBLE TORPEDO RODENT EXTERMINATOR

Masato Kawamura, Lihue, Kauai, Hawaii, assignor to The Lihue Plantation Company, Limited, Lihue, Kauai, Hawaii, a corporation of Hawaii Original application November 13, 1958, Serial No. 773,722. Divided and this application April 22, 1959, Serial No. 808,226

5 Claims. (Cl. 53—34)

The present invention relates to rodent exterminators and more particularly to an exterminator and method of forming the same. This application is a division of my co-pending application Serial No. 773,722, filed November 13, 1958.

An important object consists of a new and novel method of forming a poison bait holder for exterminating rodents, and which includes positioning an outer layer of flexible material on a base such as a table or the like, having an opening or recess therein, and so that the center portion of the material is positioned directly above the opening, placing nonpoisoned grains of cereal on the flexible material directly above the opening in the table or base, positioning a second layer of flexible material on top of the nonpoisoned grains, placing poisoned grains on the second layer directly above the opening and the nonpoisoned grains, the grains of cereal on each of the inner and outer layers being so positioned that the sides of the sheets project outwardly from the grains, and then depressing the nonpoisoned grains so as to force the outer and inner layers of material into the opening in the base or table, to form a pocket centrally of the inner and outer layers of material, and upwardly projecting free side portions, so that upon twisting of the side portions together in the same direction to close the top of the torpedo in order that the nonpoisoned grains of cereal are positioned outside of and separate from the poisoned grains.

Other objects and advantages of the invention will become apparent from the following description when taken in conjunction with the accompanying claims and drawings.

Referring to the drawings in which is shown a preferred embodiment of the invention:

Fig. 1 is a perspective view showing the outer sheet of the bait holder positioned on a table having an opening therein and with the nonpoisoned cereal disposed over the opening;

Fig. 2 is a perspective view showing the inner layer of flexible material positioned on the outer layer and the poisoned cereal thereon;

Fig. 3 is a view similar to Fig. 2 and showing the means for forming a pocket in the holder for the cereal and at the same time projecting the sides of the inner and outer layers of the material upwardly so that they may be conveniently twisted to close the holder.

Fig. 4 is a sectional view of the supporting base or table showing the inner and outer layers of the holder with the sides raised preparatory to being twisted to enclose the poisoned and unpoisoned grains within the holder; and Fig. 5 is a detailed perspective view with parts in section of the holder in its completely closed position.

Referring to the drawings, 10 indicates a supporting base which may be in the form of a table provided with a smooth flat top 11 having a vertical opening or recess 12 (Fig. 4.) A rodent exterminator preferably in the form of a bait holder indicated generally by the numeral 13 (Fig. 5), may be formed of an outer layer or piece of flexible sheet material such as wax fibre paper 14 of any suitable size and shape, preferably square as shown, and which is initially positioned on the table 10 so as to be disposed centrally over the opening 12.

Rodent food or bait preferably in the form of non-poisoned cereal such as grains of rolled oats, corn, or the like 15, in a predetermined quantity, is laid on the outer layer 14 and directly over the opening 12 (Fig. 1). A second layer or piece 16 of waxed fibre paper or the like of the same shape as the outer layer, but which may be of smaller size, is then placed on top of the unpoisoned cereal 15, so as to rest on top of the outer piece or layer of wax paper 14. Grains of poisoned cereal 17 of the same kind as the nonpoisoned grains 15, are then positioned on top of the inner layer of paper 16. The poisons used in the torpedo may be formed of zinc phosphide, or thallium sulphate; either of these poisons is used but not both at the same time.

The index finger 18 may then be used to depress the central portions of the inner and outer layers of the torpedo so as to force the same downwardly into the opening 12 and thus form a centrally disposed pocket 19, and simultaneously cause the sides of the inner layer 16 and the outer layer 14 that project beyond the nonpoisoned and poisoned grains, to extend upwardly as at 20 and 21 (Fig. 4), so that upon twisting these sides together as at 22, the grains of cereal will be enclosed within the holder and the nonpoisoned grains 15 will be positioned outside of and spaced from the poisoned grains. The exposed surface of the holder is then saturated or coated with linseed oil or the like, so as to attract the rodent to the exterminator or holder. Manifestly, the poison bait may be wrapped and enclosed by the inner layer separately from the wrapping of the nonpoisoned bait within the outer layer, and by other methods than that specifically embodied in the present invention.

It will be seen that upon twisting the corners of the pieces 14 and 16 of wax paper in the same direction, the parts will assume the position as shown in Fig. 5, and the poisoned oats disposed in a central round core of the holder, and also in the center of the nonpoisoned oats, which are retained in position by the outside sheet 14. Rodents such as rats cannot gurgitate and once a food substance enters the stomach cavity, they cannot remove it by regurgitating. Consequently, the rat will first nibble at or eat the nonpoisoned oats 15 in the outer layer of the holder and, when convinced that these oats have no injurious effect, will continue to eat and swallow enough of the poison oats mixture to cause immediate death. The outer and inner layers of wax paper, with the linseed oil coating, are so formed that the rodent or rat easily gnaws through the outer layer 14 so to partake of the nonpoisoned food before reaching the poisoned food.

The ingredients used in the formation of the double torpedo are intimately mixed by first placing a predetermined amount of the cereal, such as rolled poultry oats in a suitable mixer, pouring a predetermined liquid mixture of the poison and oil such as Standard White Oil #9 into the mixer, so as to be brought into intimate contact with the rolled oats upon agitation of the mixer. The nonpoisoned oats are separately introduced into a mixer in which is placed oil, such as Standard White Oil #9, so as to be mixed with the oats. The treated grains of poisoned and nonpoisoned cereal are then stored for use in separate receptacles and preferably are enclosed within the holder in the manner as previously described.

Thus, it will be seen that the poisoned double holders are particularly useful where destruction of crops make it difficult and costly to use other types of poison. Each holder carries a minimum lethal dose to kill at least a one-pound rodent. Each holder 13 may be made and assembled at a minimum expenditure of time, effort, and cost, so as to be conveniently spread by an airplane over infested areas. Rodents such as rats are very cautious and will not eat any type of food until convinced the food is not poisonous or injurious. As the nonpoisonous ingredients in the holder are positioned outside of the poisonous ingredients, the rodent will first nibble or eat the nonpoisoned oats in the outer layer of the torpedo and, finding this food or bait safe and without any ill effects, will continue to eat or return to eat the remainder of the bait; and when the rat swallows enough of the poisoned oats mixture, it will cause instant death.

It will be understood that the rodent exterminator and the method of forming the same as disclosed are illustrated of preferred embodiments, and that such changes as to size, shape, and ingredients may be made as come within the scope of the following claims.

I claim:

1. The method of forming a double torpedo, rodent exterminator which includes placing unpoisoned grains of cereal on a sheet of flexible material, positioning a second sheet of flexible material on top of the unpoisoned grains, positioning poisoned grains of cereal on the second sheet, the grains on said sheets being positioned so that the sides of the sheets project outwardly therefrom, and wrapping the projecting side portions of the sheets so as to enclose the grains within the torpedo so that the unpoisoned grains are positioned outside of and spaced from the poisoned grains.

2. The method of wrapping a poison torpedo for exterminating rodents, which includes placing unpoisoned grains of cereal substantially centrally on an outer sheet of flexible material, positioning a second inner sheet of flexible material on top of the unpoisoned grain and substantially centrally thereof, placing poisoned grain on the second sheet substantially centrally thereof, the grains on said sheets being positioned so that the sides of the sheets extend outwardly therefrom, wrapping the outwardly extending portions of the sheets together so as to enclose the grains within the inner and outer sheets so that the unpoisoned grains are positioned outside of and spaced from the poisoned grains, and treating the torpedo with linseed oil so as to attract the rodents.

3. The method of forming a double torpedo rodent exterminator which includes placing a flexible polygonal-shaped piece of wax fiber paper on a flat base having an opening therein with the paper substantially centrally disposed relative to the opening, placing unpoisoned grains of cereal on the paper, positioning a second piece of polygonal-shaped wax fiber paper on top of the unpoisoned grains, positioning poisoned grains of cereal on the second piece of paper, the poisoned and unpoisoned grains being disposed substantially centrally of the wax paper pieces and directly above said opening, depressing the pieces of paper so as to project the central portions thereof downwardly into said opening so as to form a pocket and upwardly projecting free sides extending outwardly beyond the cereal, and twisting the sides of the flexible sheets together so as to enclose the unpoisoned and poisoned cereal within the torpedo so that the unpoisoned grains are positioned outside of and separate from the poisoned grains.

4. The method of forming a double torpedo as called for in claim 3 in which the first piece is of larger size than the second piece.

5. The method of forming a double torpedo as called for in claim 3 in which the torpedo is treated with raw linseed oil so as to attract rodents.

No references cited.